United States Patent [19]

Benjey

[11] Patent Number: 5,518,026
[45] Date of Patent: May 21, 1996

[54] FILLER NECK BUTTERFLY CHECK VALVE

[75] Inventor: Robert P. Benjey, Dexter, Mich.

[73] Assignee: G. T. Products, Inc., Ann Arbor, Mich.

[21] Appl. No.: 316,159

[22] Filed: Sep. 30, 1994

[51] Int. Cl.⁶ ..................................................... F16K 15/14
[52] U.S. Cl. ...................................... 137/512.15; 137/852
[58] Field of Search ............................ 137/512.15, 852, 137/854

[56] References Cited

U.S. PATENT DOCUMENTS

| | | | |
|---|---|---|---|
| 1,306,391 | 6/1919 | Romanoff | 137/512.15 |
| 2,292,003 | 8/1942 | Yant | 137/512.15 |
| 2,800,920 | 7/1957 | Smith | 137/512.15 |
| 3,312,237 | 4/1967 | Mon | 137/512.15 |
| 3,416,562 | 12/1968 | Freeman | 137/512.15 |
| 3,911,949 | 10/1975 | Hilden | 137/854 |

FOREIGN PATENT DOCUMENTS 794511  5/1958  United Kingdom ............. 137/512.15

*Primary Examiner*—Robert G. Nilson
*Attorney, Agent, or Firm*—Young & Basile

[57] ABSTRACT

A one-way check valve assembly for use in the filler pipe of a vehicle fuel system to prevent liquid fuel from backing up the filler pipe. The check valve assembly includes a valve member formed from a resilient material, normally biased to a closed position in sealing engagement with the interior surface of the filler pipe flow passage, and forced open during refueling by the flow of fuel through the filler pipe inlet to the fuel tank. In a preferred form the valve member comprises a thin-walled flexible membrane formed in butterfly fashion about a central pivot member in the filler pipe. In an illustrative form the individual wings or sides of the valve member are semi-elliptical and in the closed position are angled downstream from the pivot point, conforming to the filler pipe contour in sealing fashion as angular sections of the flow passage. In a further embodiment the check valve assembly can be formed as a unitary, cup-like assembly axially inserted in sealing fashion on the filler pipe to locally define the flow passage around the valve member.

14 Claims, 2 Drawing Sheets

FILLER NECK BUTTERFLY CHECK VALVE

FIELD OF THE INVENTION

This invention relates to vehicle fuel system valves, and more particularly to one-way flow check valves in the filler pipe of a vehicle fuel system.

1. Background of the Invention

A frequent problem encountered when filling a vehicle fuel tank is "spitback," caused by liquid fuel backing up the filler pipe and out the inlet when the tank is filled. Liquid fuel may also be propelled out of the filler pipe during high tank pressure conditions when the filler pipe inlet is opened for refueling.

Attempts to solve the spitback problem have included the provision of shutoff-inducing structure in fuel tank mounted control valves; automatic shutoff apparatus in the filler nozzle; and vapor/liquid-tight fuel door structure to sealingly engage the filler nozzle inserted in the filler pipe.

2. Summary of the Invention

It is an object of the present invention to provide a simple, reliable valve means in the filler neck to eliminate the spitback problem by positively preventing liquid fuel backup past a desired point.

In general, the invention is achieved with a one-way, positive action check valve assembly in the filler pipe. The check valve assembly includes a valve member formed from a resilient material, normally biased to a closed position in sealing engagement with the interior surface of the filler pipe flow passage, and forced open during refueling by the flow of fuel through the filler pipe inlet to the fuel tank.

Interference-free operation is achieved by anchoring the valve member to the filler pipe at a portion of the valve member which essentially conforms to a perpendicular section of the filler pipe contour, and thereafter forming the contour of the valve member as a downwardly-angled planar section of the filler pipe flow passage with a free end angled from the anchored end in the valve closed position at a first downstream angle. During refueling the free end moves to an open position at a second greater downstream angle.

The angled placement in the filler pipe of the valve member and its angular section ensure a good seal between the valve member and the filler pipe in the closed position, while at the same time preventing interference or friction therebetween as the valve member moves within the filler pipe between the open and closed positions. The interior of the filler pipe is provided with angled seating surfaces matching the plane of the valve member in the closed position to provide a secure sealing surface or seat for the periphery of the valve member. To insure smooth flow to the filler pipe and across the valve member, the portion of the filler pipe flow passage above the valve member is formed with a decreasing interior diameter terminating in a venturi-like throat formed by the angled seating surface.

In a preferred form the valve member comprises a thin-walled flexible membrane formed in butterfly fashion about a central pivot member in the filler pipe, for example, a pin or clip disposed laterally across the filler pipe flow passage. The individual wings or sides of the valve member in the closed position are angled downstream from the pivot point, conforming to the filler pipe contour in sealing fashion. The valve member is normally biased to the closed position, for example with an inherent spring bias. Liquid fuel from the filler nozzle forces the wings of the valve member to a further downstream angle to permit flow into the fuel tank. When refueling ceases, or when fuel begins backing up the filler pipe, the wings of the valve member are forced apart to the closed position in sealing engagement with the interior wall of the filler pipe.

In yet a further embodiment, the valve is part of a unitary, cup-like assembly which can be axially inserted in sealing fashion in the filler pipe to locally define the flow passage.

These and other features of the invention will become apparent upon further reading of the specification.

DETAILED DESCRIPTION OF THE ILLUSTRATED EMBODIMENTS

Figure 1:
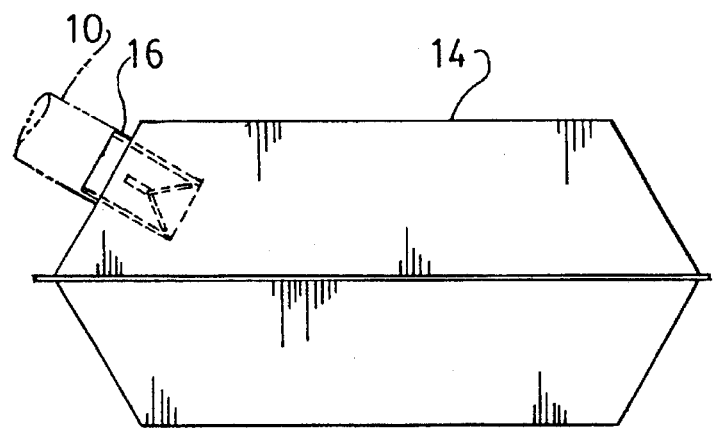
FIG. 1 is a schematic view of a check valve according to the present invention mounted in a vehicle fuel system filler pipe.

Referring now to FIG. 1, a schematically illustrated check valve assembly 16 according to the present invention is shown mounted in the filler pipe 10 of a vehicle fuel system. Filler pipe 10 is selectively opened and closed at its upper end, for example by a cap (not shown) and delivers fuel to fuel tank 14 at its lower end. Known seal door structure can be used in the filler pipe above check valve 16.

Check valve assembly 16 is located in the lower end of filler pipe 10, preferably at its base in the fuel tank a desired distance from the full fuel level to limit the rise of liquid fuel up the filler pipe when the tank is filled. Check valve assembly 16 opens in response to liquid fuel flow from the filler pipe inlet to the fuel tank, and closes automatically when refueling ceases and/or liquid fuel backs up the filler pipe to the level of the check valve.

In the illustrative embodiment of FIGS. 2–6, the check valve assembly 16 comprises a cup-like, open-ended housing 18 with an inlet end 17 toward the filler pipe inlet and an outlet end 19 toward the fuel tank. Housing 18 locally defines the filler pipe flow passage.

Housing 18 includes a pivot or anchor member 20 about which the wings 23 of a valve member 22 are formed in butterfly fashion. Anchor member 20 in the illustrated embodiment comprises a transverse pin fastened at each end to the side wall of housing 18, for example in suitable holes or sockets. A transverse rib 21 aligned with and positioned just above pin 20 includes a V-shaped seating surface 21a for the hinged center of valve member 22 to securely hold it in place on pin 20 at a desired angle. Wings 23 of valve member 22 have an inherent spring bias tending to force them apart into engagement with the interior side wall of housing 18 to the closed position of FIG. 3.

Figure 3:
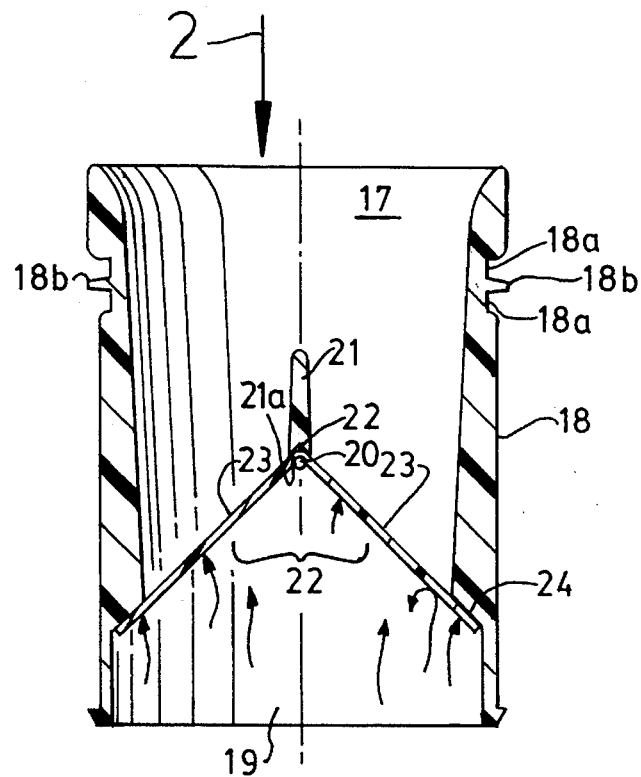
FIG. 3 is a side section view of the valve assembly of FIG. 2 with the valve member in a closed condition.
Figure 4:
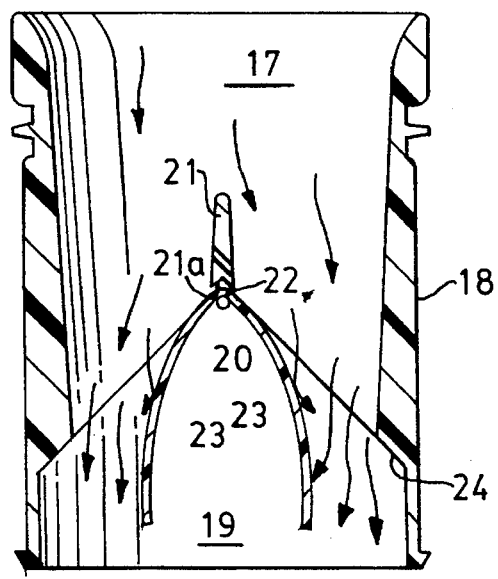
FIG. 4 illustrates the valve member of FIG. 3 in an open condition.

As shown in FIG. 3, valve member wings 23 in the closed, rest position are angled downstream toward the outlet 19 of housing 18 in the direction of fuel flow into the fuel tank. The spring bias of wings 23, whether inherent in the material as illustrated or applied from an external source, forces the wings outwardly into sealing engagement with the interior wall of housing 18. When fuel is introduced through the filler pipe into the fuel tank from inlet end 17 of housing 18, wings 23 are forced to a further downstream angle as shown in FIG. 4 to open the flow passage through housing 18. When refueling ceases, or when liquid fuel backs up the filler pipe to housing 18 as illustrated by the arrows in FIG. 3, wings 23 are forced back apart into sealing engagement with housing 18.

Figure 5:
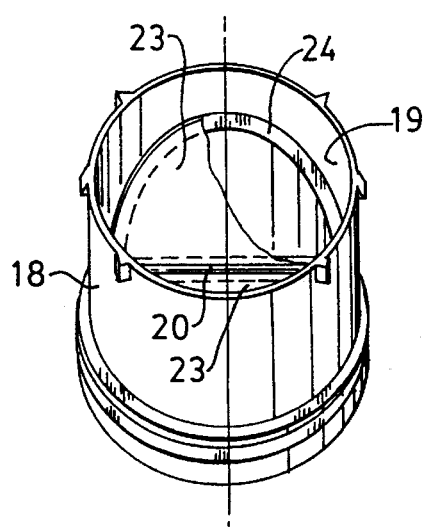
FIG. 5 is a bottom perspective view of the valve assembly of FIG. 2 partially cut away to better show the internal structure.

As best shown in FIGS. 3 and 5, the periphery of valve member 22 in the valve closed position rests against angled seating surfaces or shoulders 24 formed on the interior side wall of housing 18. Surfaces 24 are coplanar with the angled seating surfaces 21a of the V-shaped recess in transverse rib 21, thereby defining a continuous, downstream-angled seating surface for each valve member wing 23. The width of seating surfaces 24 is sufficient to engage a continuous peripheral portion of wings 23, providing a secure seal and support for the valve member in the closed position against the force of fuel rising back up the filler pipe. In the preferred form surfaces 24 are formed continuously with surfaces 21a, resulting in a semi-elliptical, somewhat D-shaped seating surface 21a,24 for each wing 23.

Figure 6:
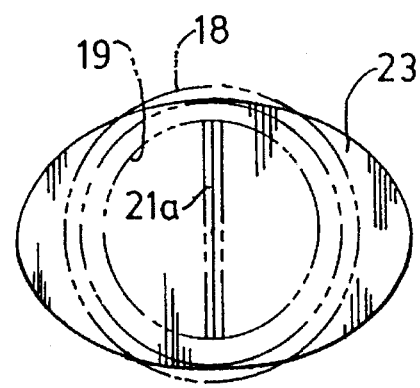
FIG. 6 is a bottom plan view of the valve assembly of FIG. 2, illustrating the relative dimensions of the valve member and the filler pipe flow passage.

Referring now to FIGS. 5 and 6, the wings 23 of valve member 22 are shaped such that they do not conform with the perpendicular cross-section or contour of housing 18. In the illustrated embodiment the contour of housing 18 (and therefore of the filler pipe flow passage) is circular as shown in phantom, while valve member 22 when spread flat and perpendicular to housing 18 generally has an elongated, elliptical contour shown in solid lines. The width of the central portion of valve member 22 matches the internal diameter of housing 18, while the width of each wing 23 continuously decreases toward its free downstream end in semi-elliptical fashion. Wings 23 in effect define downstream-angled planar sections of the cylindrical flow passage defined by housing 18 in the filler pipe, and accordingly conform to the housing sidewall when angled downstream as shown in FIG. 3. The downstream angle and shape of the operative valve portions provide a natural opening and closing bias in accord with the desired check valve function, and eliminate interference between the housing sidewall and the valve member as wings 23 move between their open and closed positions.

A further inventive feature is the venturi-shaped transition surface in the flow passage formed by the interior sidewall of housing 18 across valve member 22. The diameter of housing 18 from inlet end 17 to angled seating surfaces 24 is progressively narrowed with a continuous thickening of the sidewall. Outwardly-flaring seating surfaces 24 define the "throat" assisting flow in the manner of a venturi by increasing flow area and decreasing pressure at the transition across the valve member. At the same time surfaces 24 ensure a positive stop and sealing surface for valve wings 23 when liquid fuel backup forces them apart to the closed position.

Figure 2:
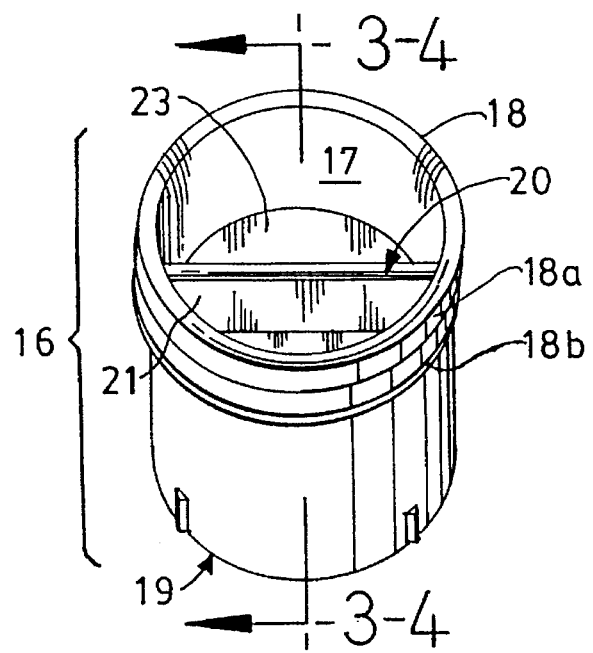
FIG. 2 is a top perspective view of a unitary, cup-like check valve assembly according to the present invention for axial insertion in a filler pipe.

Housing 18 includes an annular groove 18a near inlet end 24 including an O-ring type seal portion 18b, either integrally molded in housing 18 as illustrated or attached separately. When the cup-like housing 18 is inserted in the filler pipe, seal 18b sealingly engages the interior wall of the filler pipe to prevent flow of fuel and vapor around the inserted housing. As shown in FIG. 2, the inlet end of housing 18 is belled or faired to defined a smooth transition for liquid fuel as it enters the housing 18.

Valve member 22 in the illustrated embodiment comprises a thin-walled, flexible, resilient elliptical member symmetrically formed, folded or hinged about pin 20, in the illustrated embodiment formed from a suitable fuel resistant polymer such as acetal. Each wing 23 of valve member 22, as discussed above, defines a downstream-angled planar section of the cylindrical flow passage in housing 18.

It will be apparent to those skilled in the art that check valve assembly 16 need not comprise a separate, cup-like insert housing 18 as shown in the illustrated embodiment. The venturi-shaped flow passage and valve seating surfaces 24 of housing insert 18 could be formed integrally in the filler pipe, with valve member 22 mounted directly therein.

The invention is not to be limited to the foregoing illustrative embodiment, as many variations and modifications of the invention will lie within the scope of the appended claims.

I claim:

1. For use in the filler pipe of a vehicle fuel system having an inlet end for the introduction of fuel and an outlet end for delivering the fuel to a fuel tank, a valve assembly for the filler pipe comprising:

an essentially circular fluid passage with an inlet end, an outlet end, a sidewall between the inlet and outlet, and a downstream angled seating surface in the sidewall comprising an angled circumferential section of the fluid passage, the thickness of the sidewall being progressively thickened and the diameter of the fluid passage being correspondingly narrowed from the inlet to the angled seating surface such that the angled seating surface defines a venturi throat;

butterfly check valve means in the filler pipe comprising a resilient valve member biased to a closed position at a first downstream angle engaging the angled seating surface, and movable to an open position at a second further downstream angle.

2. For use in a filler pipe of a vehicle fuel system having an inlet end for the introduction of fuel and an outlet end for delivering fuel to a fuel tank, a valve assembly for the filler pipe comprising:

check valve means in the filler pipe comprising a resilient valve member biased to a closed position at a first downstream angle engaging an interior sidewall of the filler pipe, and moveable to an open position at a second further downstream angle, the valve assembly further including an angled seating surface on the filler pipe sidewall for engaging a peripheral portion of the valve member in the closed position, the seating surface being defined by an angular circumferential section of the sidewall corresponding to the peripheral portion of the valve member, wherein the thickness of the filler pipe sidewall is progressively thickened and the diameter of the filler pipe is correspondingly narrowed from the inlet end to the angled seating surface to form a venturi-shaped sidewall portion of the filler pipe, and the angled seating surface defines the throat of the venturi-shaped sidewall portion of the filler pipe.

3. Apparatus as defined in claim 5, wherein the filler pipe cross-section is circular and the valve member is elliptical.

4. Apparatus as defined in claim 5, wherein the valve member comprises a thin-walled flexible member formed in butterfly fashion about an anchor member extending transversely across the filler pipe, the valve member having two downwardly-angled wing portions engaging the sidewall of the filler pipe in the closed position.

5. Apparatus as defined in claim 4, wherein the wing portions of the valve member comprise angular sections of the filler pipe flow passage.

6. Apparatus as defined in claim 5, wherein the check valve means comprise a unitary cup-like assembly removably inserted in the filler pipe to define the interior sidewall adjacent the valve member.

7. For use in the filler pipe of a vehicle fuel system having an inlet for the introduction of fuel and an outlet for delivering fuel to a fuel tank, a valve assembly for the filler pipe comprising:

a valve housing defining a fluid passageway and including a first inlet end disposed toward the filler pipe inlet, a second outlet end disposed toward the filler pipe outlet, and a sidewall between the inlet and outlet ends;

an angled seating surface defined by a planar angular circumferential section of the sidewall, the angled seating surface defining the throat of a venturi-shaped portion of the passageway formed by a progressive thickening of the sidewall and a corresponding narrowing of the diameter of the fluid passage from the inlet end to the angled seating surface; and butterfly check valve means disposed within the housing and moveable between a closed position at a first downstream angle engaging the angled seating surface and an open position at a second further downstream angle.

8. The valve assembly of claim 6, wherein the butterfly check valve means comprises a resilient valve member biased to the closed position.

9. The valve assembly of claim 8, wherein the housing further comprises an anchor member extending transversely across the passageway, the anchor member including a V-shaped recess having angled seating surfaces opening towards the outlet end of the housing.

10. The valve assembly of claim 9, wherein the valve member comprises a thin-walled flexible member with a hinge portion supported on the angled seating surfaces of the V-shaped recess of the anchor member, the valve member having two downwardly-angled wing portions, each wing portion comprising an angular section of the passageway.

11. The valve assembly of claim 9, wherein the angled seating surfaces of the V-shaped recess and the angled seating surfaces in the housing sidewall are coplanar.

12. The valve assembly of claim 11, wherein the angled seating surfaces of the V-shaped recess and the angled seating surfaces of the housing sidewall define a continuous downstream angled seating surface engaging a peripheral portion of the valve member.

13. The valve assembly of claim 12, wherein the continuous downstream angled seating surface comprises two semi-elliptical portions.

14. For use in the filler pipe of a vehicle fuel system having an inlet for the introduction of fuel and an outlet end for delivering the fuel to a fuel tank, a valve assembly for the filler pipe comprising:

an essentially cylindrical housing comprising an essentially circular fluid passage with an inlet end, an outlet end, a sidewall between the inlet and outlet end, a transverse rib member extending laterally across the fluid passage and integral with the sidewall of the housing, a downstream-angled seating surface comprising two semi-elliptical D-shaped surfaces formed in the sidewall of the housing and the transverse rib member, and a butterfly type valve member comprising a thin walled resilient member with a hinged middle supported on the angled seating surfaces in the transverse rib member and two wing portions supported on the angled seating surfaces formed in the housing sidewall, wherein the thickness of the sidewall progressively increases and the diameter of the fluid passage correspondingly decreases from the inlet end of the housing to the downstream angled seating surface, such that the downstream angled seating surface defines a venturi throat for assisting flow past the valve member from the inlet end to the outlet end.

* * * * *